Figure 1:
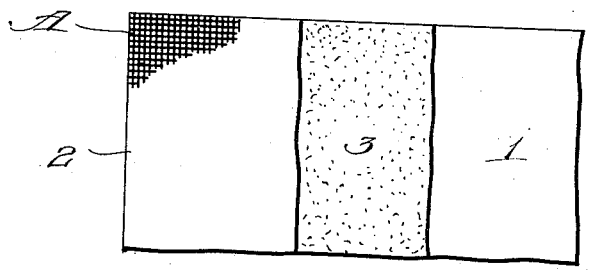

Dec. 30, 1941.　　　　A. ELMENDORF　　　　2,267,721

METHOD OF MAKING PLYWOOD

Filed June 14, 1939

Inventor:
Armin Elmendorf,
by Wm. F. Freudenreich,
Atty.

Patented Dec. 30, 1941

2,267,721

UNITED STATES PATENT OFFICE 2,267,721

METHOD OF MAKING PLYWOOD

Armin Elmendorf, Winnetka, Ill.

Application June 14, 1939, Serial No. 279,037

2 Claims. (Cl. 144—309)

In my prior application, Serial No. 245,445, filed December 13, 1938, I have disclosed a novel method of drying wet wood veneers in such a manner that the width thereof across the grain is not substantially diminished in drying the veneers to a bone dry state from a state in which the moisture content is at the fiber saturation point; together with a novel method of manufacturing plywood in a manner to make practical use of this drying method. The present application relates to this same invention.

In manufacturing plywood panels in accordance with the aforesaid invention, for commercial use, it was found that blisters occurred in a substantial percentage of all panels produced. There seemed to be no consistency in or determinable rule with respect to the appearance of these blisters, aside from those that were obviously caused by variation in thickness of a ply or lack of uniformity in a glue layer. Upon carefully analyzing a large number of panel sections containing such blisters, I discovered that in every instance of what had been an unexplainable blister, the defect occurred between meeting faces of heartwood whereas, where sapwood met sapwood or heartwood and sapwood met, the bonding was perfect. It is upon this discovery that the present application is based, except as principles set forth in my aforesaid previous application are included.

The fundamental principle involved in my prior application is that while it has long been known that very thin veneers can be dried without shrinking across the grain by bonding them to backings of sufficient mass and porosity to absorb the moisture that is driven out of the veneer through the action of heat, without decreasing substantially in width across the grain, no method was previously known by which veneers having a thickness of one-twenty-eighth of an inch or more could be dried without undergoing the normal shrinkage across the grain. It was therefore the general practice, previously, to dry the thicker veneers in roller driers or chain driers. When drying veneers between hot plates, these must be separated from time to time, during the drying process, to permit the steam to escape. This latter process is not only slow and costly but, during the open periods of the press, leaves the veneers unrestrained and allows them to contract. When the drying in a hot press is carried out with a bonding operation to produce plywood, the contraction takes place during the open periods of the press causes splitting of the facings.

In accordance with my invention, means are provided to grip the outer face or faces of a plywood assembly at a great many points distributed over the length and breadth thereof so that, in drying, the veneer or veneers so gripped are held against contraction. Furthermore, the facing or facings are permitted to breathe through their broad outer surfaces and not simply through their edges, so that the steam as it is formed can escape without opening the press.

When a wet veneer is heated, steam can travel toward both broad surfaces thereof through the pores which in hard woods, at least, are in the form of long tubes some of which open out through one face of a sheet of veneer while others extend to the opposite face, not all of the tubular elements being parallel with the faces. Consequently, when steam is discharged at the under or inner surface of a facing veneer, it can find its way through the body of the veneer to the opposite surface through pores or canals extending from one of said surfaces to the other. In sapwood these pores or panels are unobstructed so as to permit the passage of steam. However, in heartwood, of some species, the pores contain tyloses, gums or other botanical obstructions, and if steam finds itself pocketed under a considerable area of heartwood, it is unable to escape through the pores of the wood in that area. Sap also travels through the fibers themselves in the sapwood, the fibers being in the form of little tubes closed at the ends and having in the sides little pits. Sap can flow from the interior of one fiber into another through registering pit membranes. These paths may also be closed in heartwood because of mineral deposits or gum not present in sapwood. Consequently, when two heartwood areas in adjacent plies register with each other in the drying and bonding process, the additional outlet for the steam that is formed, through the fibers themselves, if the wood were sapwood, is also closed. If a contiguous layer happens to present an area of heartwood directly underneath the heartwood in the outer layer, the steam remains sealed in pockets between the layers, with the result that a blister is formed in this region of the panel due to the failure of a proper bond being created. This blistering is entirely avoided by making certain that every substantial area of heartwood which may exist in one layer registers with sapwood in a contiguous layer; a sure way of avoiding blisters being to have at least one layer or ply of each contiguous pair composed of sapwood.

The present invention or discovery may therefore be regarded as being an improvement in the method of my aforesaid application to insure its successful commercial practice with veneers and cores containing both sapwood and heartwood.

Figure 2:
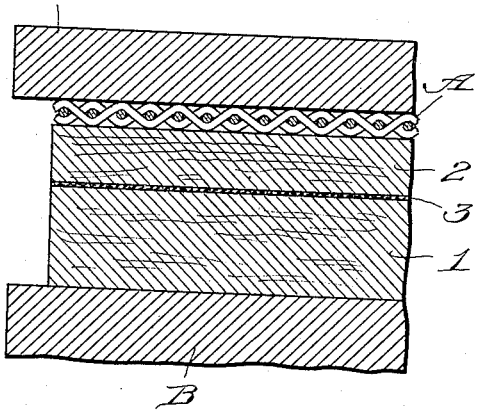
Figure 3:
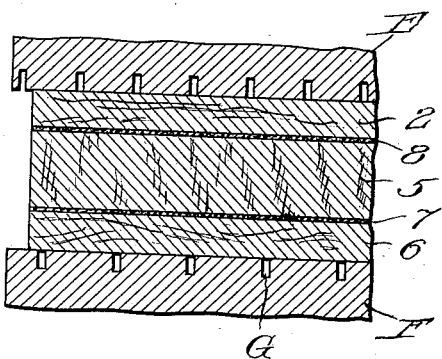
Figure 4:
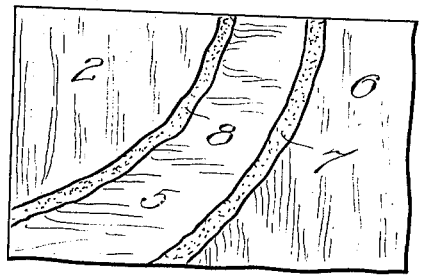

I have illustrated my invention or discovery more or less diagrammatically in the accompanying drawing, wherein: Figure 1 is a plan view showing a fragment of an assembly for a two-ply material, together with an overying caul, sections being broken away to disclose the various layers; Fig. 2 is a section through a press closed on an assembly such as illustrated in Fig. 1, the section being taken at right angles to the plane of the sheet of veneer; Fig. 3 is a view similar to Fig. 2, illustrating the method of making a three-ply panel while drying the two face plies; and Fig. 4 is an elevational view of a fragment of the panel of Fig. 3, broken away to disclose the various wood and glue layers.

In Figs. 1 and 2, 1 represents a wood core member and 2 a sheet of wood veneer which still contains all of its original hygroscopic moisture or, at least, a substantial part thereof which it is desired to eliminate. In fact, the veneer may be in the same wet state at which it left the log. The veneer is laid upon the core member with a suitable adhesive 3 interposed between the same. A precaution which must be taken is to make certain that if one of the plies is composed of heartwood, the other must be all sapwood, or substantially so. In case either or both plies contain both heartwood and sapwood, each substantial area of heartwood in one must come opposite sapwood in the other. On top of the sheet of veneer is placed a caul A, illustrated as being in the form of a wire screen of fine mesh. I prefer that the mesh shall be from fifty to one hundred to the inch, a good working size being about eighty mesh to the inch, although these are not to be regarded as absolute limits. The assembly is laid on the lower platens of a hot press B, and the upper platen C is then lowered and the requisite pressure applied. With the hot press at the temperature usual in bonding veneers by the hot process, the press need remain closed only three or four minutes in order to dry veneer faces one-twentieth of an inch in thickness and bond them to dry cores three-sixteenths of an inch thick. The caul is so open that the steam created by the heating of the moisture in the veneer escapes freely.

In Fig. 3 there is illustrated an assembly for the making of a three-ply panel comprising a central wood core 5, and facing plies 3 and 6 and layers of glue 7 and 8, between the core and the respective facing plies. Assuming that both of the plies 3 and 6 require drying, the caul A may be laid on the veneer 3, as before, and another, similar caul, be placed underneath the veneer 6. When such an assembly is placed in the hot press and the latter is closed, the three plies are bonded together and the steam evolved by each facing veneer escapes through the adjacent caul. However, instead of using the means shown in Figs. 1 and 2 to permit the steam to escape while holding the veneers against contraction, the press of Fig. 3 is shown as being provided with platens E and F the working face of each of which is filled with numerous tiny grooves G extending entirely across the platen from one edge to the opposite edge. These grooves need not be more than one one-hundredth of an inch wide, a thirty-secondth of an inch deep and be spaced apart from each other about an eighth of an inch. While the grooves are tiny, they constitute channels of ample size to carry away the steam as rapidly as it is generated. In fact, the grooved platen is more efficient than the screen in that the latter may embed itself entirely in the wood under heavy pressure and thus cause the veneer to bear against the flat face of the platen and thus seal the outlets for the steam. However, screens may be employed along with grooved platens because the channels in the latter permit the passage of steam even though the screens become embedded in the wood. The same rule with respect to the disposition of heartwood and sapwood areas in contacting plies as that followed in two-ply work, applies here, also.

My invention is not confined to so-called wood veneers, since sawn boards of three-sixteenths to one-quarter of an inch in thickness may be bonded to other members in the veneer herein described; and, by veneers I mean these other materials.

The advantages of the process, broadly considered, have been explained in detail in my aforesaid application and need not be further explained here; the advance in the present application over the disclosure in the other having to do with the elimination of spoiled panels due to blistering from causes not previously understood, in the making of dry plywood from assemblies containing wet facing veneers.

I claim:

1. The method of making dry plywood which comprises assembling a facing layer of wood veneer which has a moisture content approaching or extending beyond the fiber saturation point and a much drier layer of wood, with glue interposed between the same, engaging all heartwood areas of considerable size in each layer by sapwood areas in the other layer; applying pressure and heat to the assembly to bond the layers together and dry the facing veneer; and preventing contraction of the facing veneer across the grain, while drying, by holding the face thereof at numerous small areas spaced apart from each other while the remainder of the face remains exposed.

2. The method of making dry plywood including two facing laminae of wood veneer and a core: which comprises assembling said wood veneers while they have a moisture content approaching or extending beyond the fiber saturation point and a much drier core, with glue interposed between the core and the veneers, engaging all heartwood areas of considerable size in each ply by sapwood areas in the adjacent ply; pressing the assembly together in such a manner that pressure is imposed on the exposed face of each veneer ply at closely spaced small areas distributed across the length and breadth thereof, while the remaining areas of the said faces remain exposed; and heating the assembly to cause the laminae to become bonded together and any desired part of the moisture in the veneer to be converted into steam which escapes at the exposed areas in the veneer faces.

ARMIN ELMENDORF.